(12) United States Patent
Monti

(10) Patent No.: US 11,807,467 B2
(45) Date of Patent: Nov. 7, 2023

(54) METHOD FOR TRANSFERRING STICKPACKS FROM AN OUTLET OF A PACKAGING MACHINE TO A CONVEYOR MEANS CONTINUOUSLY ACTIVATED FOR SUPPLY TO A BOXING MACHINE, AND A TRANSFER STATION OF THE STICKPACKS

(71) Applicant: MARCHESINI GROUP S.p.A., Pianoro (IT)

(72) Inventor: Giuseppe Monti, Pianoro (IT)

(73) Assignee: MARCHESINI GROUP S.p.A., Pianoro (IT)

( * ) Notice: Subject to any disclaimer, the term of this patent is extended or adjusted under 35 U.S.C. 154(b) by 0 days.

(21) Appl. No.: 17/762,482

(22) PCT Filed: Oct. 27, 2020

(86) PCT No.: PCT/IB2020/060053
§ 371 (c)(1),
(2) Date: Mar. 22, 2022

(87) PCT Pub. No.: WO2021/084413
PCT Pub. Date: May 6, 2021

(65) Prior Publication Data
US 2022/0332515 A1 Oct. 20, 2022

(30) Foreign Application Priority Data
Oct. 29, 2019 (IT) .................. 102019000019912

(51) Int. Cl.
*B65G 43/10* (2006.01)
*B65B 35/24* (2006.01)
(Continued)

(52) U.S. Cl.
CPC .............. *B65G 43/10* (2013.01); *B65B 35/24* (2013.01); *B65B 61/28* (2013.01); *B65G 17/12* (2013.01); *B65G 47/06* (2013.01)

(58) Field of Classification Search
CPC ......... B65B 35/24; B65B 61/28; B65G 43/10; B65G 17/12; B65G 47/06
(Continued)

(56) References Cited

U.S. PATENT DOCUMENTS

| 1,545,400 | A | * | 7/1925 | Comstock | ................ | A21C 5/04 |
| | | | | | | 198/457.07 |
| 2005/0262803 | A1 | * | 12/2005 | Monti | ..................... | B65B 35/32 |
| | | | | | | 53/147 |

FOREIGN PATENT DOCUMENTS

| EP | 0491900 | A1 | | 7/1992 | | |
| EP | 491900 | B1 | * | 3/1994 | ............... | G06K 1/12 |

(Continued)

*Primary Examiner* — James R Bidwell
(74) *Attorney, Agent, or Firm* — R. Neil Sudol; Henry D. Coleman

(57) ABSTRACT

Transferring stickpacks from a packaging machine to a conveyor for supply to a boxing machine entails continuously activating the conveyor in an advancement direction so that housings of the conveyor continuously transit beneath hoppers. Stickpacks fall from chute channels at an outlet of the packaging machine and collect in respective hoppers. Positions of the housings with respect to the hoppers are determined. Unloading hatches of the hoppers are sequentially opened so that the stickpacks present in the hoppers fall into respective housings beneath the hoppers during the continuous advancement of the conveyor in the advancement direction.

4 Claims, 3 Drawing Sheets

(51) Int. Cl.
*B65B 61/28* (2006.01)
*B65G 17/12* (2006.01)
*B65G 47/06* (2006.01)

(58) Field of Classification Search
USPC .......................................................... 198/434
See application file for complete search history.

(56) References Cited

FOREIGN PATENT DOCUMENTS

| EP | 1347276 | A2 | | 9/2003 | |
|---|---|---|---|---|---|
| EP | 2404830 | A1 | | 1/2012 | |
| JP | 5-310220 | | * | 11/1993 | ............. B65G 43/08 |
| WO | WO2004/039707 | A1 | | 5/2004 | |

* cited by examiner

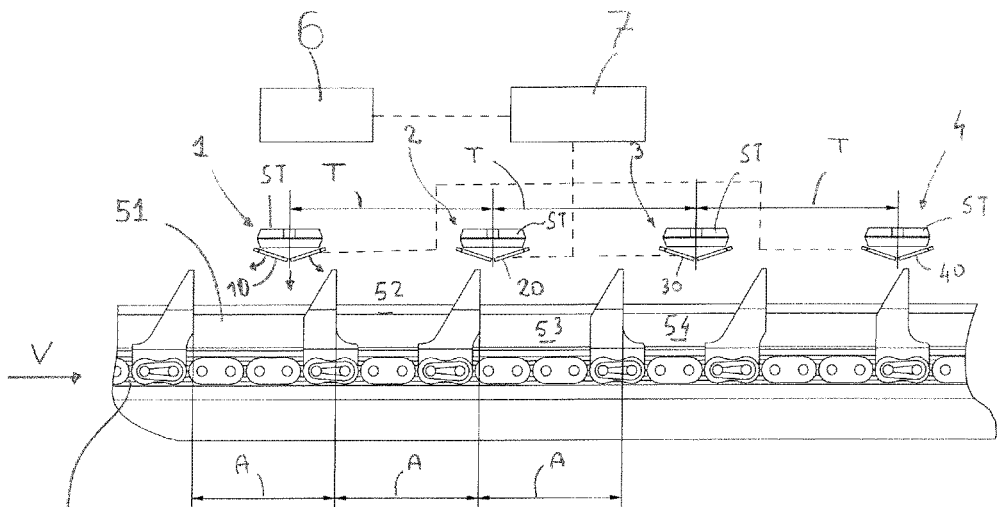
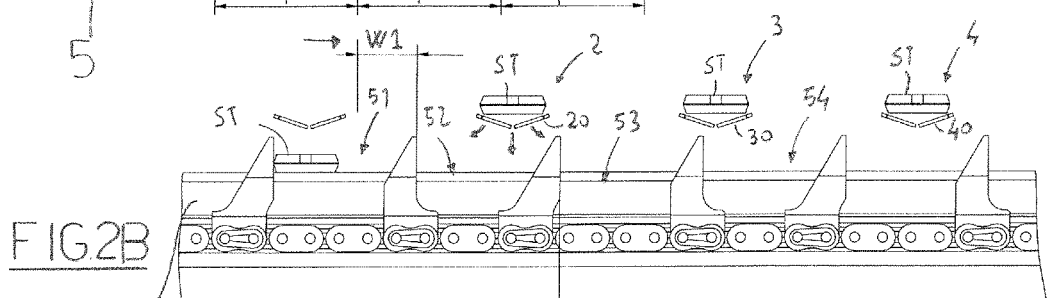
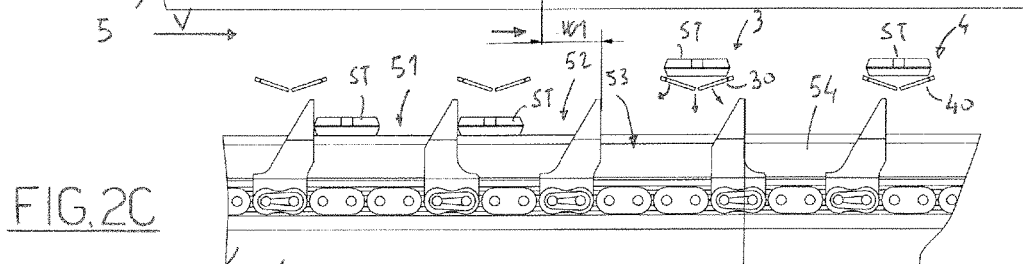
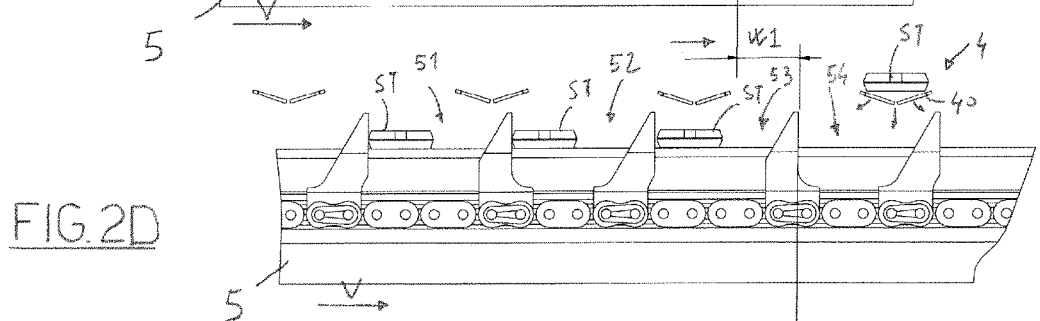
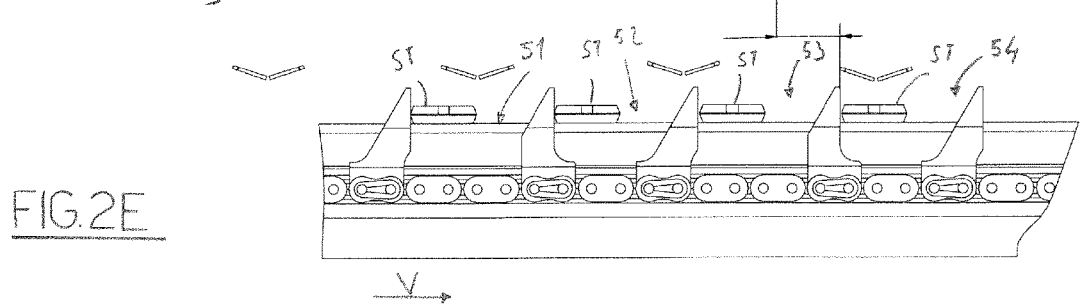

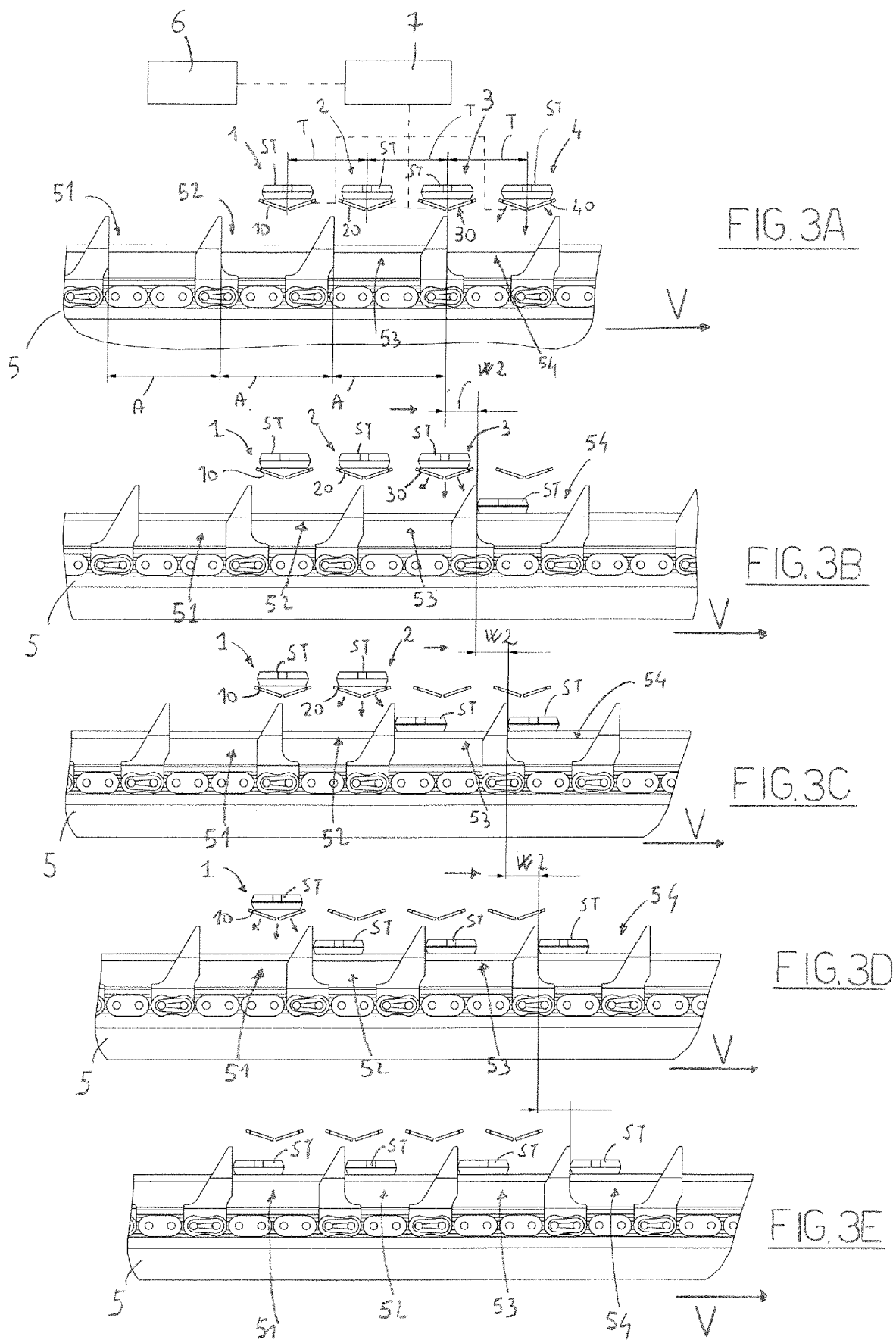

METHOD FOR TRANSFERRING STICKPACKS FROM AN OUTLET OF A PACKAGING MACHINE TO A CONVEYOR MEANS CONTINUOUSLY ACTIVATED FOR SUPPLY TO A BOXING MACHINE, AND A TRANSFER STATION OF THE STICKPACKS

FIELD OF THE INVENTION

The present invention relates to the technical sector concerning the packing of products, for example in liquid, powder or granular form, internally of stickpacks.

DESCRIPTION OF THE PRIOR ART

Stickpacks are packs obtained from portions of film made of a heat-weldable material, cut from a reel, which are wound about the product to be packaged to form tubular elements, which are subsequently heat-welded longitudinally and at two heads, thus forming tubular sachets that are sealed on three sides.

Stickpacks, in outlet from the packaging machine, must then be transferred by means of a conveyor means to the inlet of a boxing machine which will insert them, singly or in groups, internally of the relative boxes.

Packaging machine of stickpacks comprise an outlet station provided with a series of chute channels for the stickpacks.

At the position of the chute channels are located collecting hoppers or bins, having a shape that is suitable for receiving the stickpacks unloaded from the chute channels.

The pitch, or reciprocal distance, between the chute channels, and therefore between the hoppers of the stickpacks, depends on the width of the portions of film which are cut from the reel and folded to form the tubular elements to realise the stickpacks.

For example, in the event that the width of the single portions of film is 45 mm, then the pitch, or reciprocal distance between the chute channels, and thus of the hoppers, will be 45 mm, in such a way that each hopper can receive internally thereof a relative stickpack coming from a corresponding chute channel.

Usually stickpacks are obtained from the folding of portions of film that can have a width of 45 mm, 60 mm or 70 mm.

Consequently, according to the type of products to be packaged and the dimensions of the relative stickpacks that will be obtained, a series of hoppers will have to be predisposed at the outlet station of the packaging machines, having a pitch, or reciprocal distance, imposed by the pitch or reciprocal distance of the chute channels of the stickpacks, therefore, for example, with a pitch of 45 mm, 60 mm, or 70 mm.

The conveyor means, for transporting and supplying the stickpacks to the inlet of the boxing machines, comprise a series of housings, or drawers, each of which is disposed to receive a relative stickpack.

The housings of the conveyor means have, on the other hand, a pitch, or reciprocal distance, that is different to the pitch existing between the collection hoppers, as it is imposed by the special characteristics of the boxing machine.

Further, the boxing machines require filling in inlet with the products, and therefore the stickpacks to be inserted in the boxes, in a continuous mode, and therefore the conveyor means must be activatable continuously.

Thus, there exists a problem connected with how to carry out the transfer of the stickpacks from the outlet station of the packaging machines, in particular from the collecting hoppers of the stickpacks, to the housings of the conveyor means activated in continuous mode, which is arranged to supply the inlet of the boxing machines.

A transfer mode of known type consists in the use of robotic devices of the pick-and-place type, suitable for picking, using relative gripping means, borne by arms that are movable in space, the stickpacks present in the hoppers and transfer them, while changing the relative distance between the housings of the conveyor means, into the housings, while the conveyor means is activated in continuous mode.

Apart from the costs that this solution brings, the use of pick-and-place robotic device requires in any case an adequate maneuvering space, with a consequent increase in volumes.

SUMMARY OF THE INVENTION

The aim of the invention is therefore to make available a method for transferring stickpacks from an outlet of a packaging machine to a conveyor means continuously activated for supply to a boxing machine, able to obviate the drawbacks set out in the foregoing.

In particular, the aim of the present invention is therefore to provide a method for carrying out the transfer of the stickpacks in immediate and effective ways and which do not require recourse to robotic devices or members, thus reducing sizes.

A further aim of the invention is to provide a transfer station of stickpacks configured and adapted to carry out the transfer method.

The above aims are attained according to the claims.

BRIEF DESCRIPTION OF THE DRAWINGS

The characteristics of the preferred method of the invention and of preferred embodiments of the transfer station are described in the following with reference to the appended tables of drawings, in which:

FIG. 2A and FIG. 3A illustrate, in partial schematic front views, particular components of the transfer station according to two possible preferred embodiments;

Figure 1:
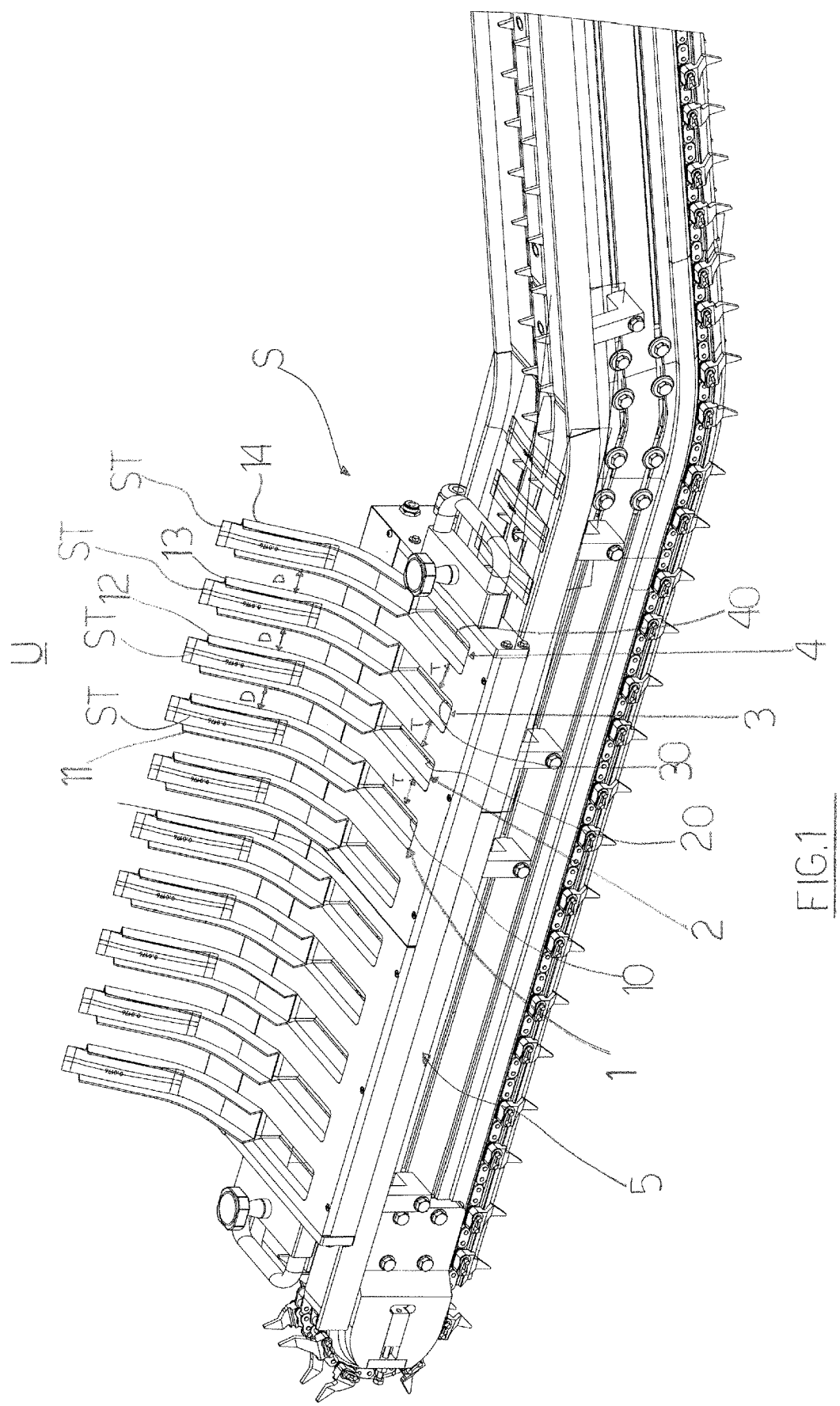
FIG. 1 is a schematic perspective view of the transfer station of the present invention.

the sequence of FIGS. 2A, 2B, 2C, 2D and 2E illustrate a possible preferred mode of actuation of the method of the invention;

the sequence of FIGS. 3A, 3B, 3C, 3D and 3E illustrate a further possible preferred mode of actuation of the method of the invention.

DESCRIPTION OF THE PREFERRED EMBODIMENTS

With reference to the accompanying tables of drawings, reference letter (S) denotes the transfer station of stickpacks (ST), object of the present invention in its entirety.

The transfer station (S) comprises a series of hoppers (1, 2, 3, 4) which are situated and positioned corresponding to a series of chute channels (11, 12, 13, 14) of an outlet (U) of a packaging machine (not illustrated) of stickpacks (ST).

Usually, in fact, the packaging machine of stickpacks, once the stickpacks have been realised starting from relative heat-weldable portions of film cut from a reel, direct the stickpacks to an outlet (U) comprising a series of chute channels (11, 12, 13, 14).

The chute channels (11, 12, 13, 14) of the outlet of the packaging machine, as described in the foregoing, are distanced from one another by a distance (D) corresponding to the width of the portions of film used for realising the stickpacks.

The transfer station (S) is therefore configured and predisposed in such a way that the hoppers (1, 2, 3, 4) are distanced from one another by a pitch (T) equal to the distance (D) existing between the chute channels (11, 12, 13, 14) (see for example FIG. 1).

Each hopper (1, 2, 3, 4) is configured to receive a stickpack (ST) falling from a relative chute channel (11, 12, 13, 14) and comprising an unloading hatch (10, 20, 30, 40) openable for unloading the stickpack (ST).

The transfer station (S) further comprises a conveyor means (5) for supplying a boxing machine (not illustrated) which is made in such a way as to comprise a series of housings (51, 52, 53, 54), distanced from one another by a pitch (A) and configured each to receive a relative stickpack (ST) to be conveyed to the boxing machine.

The pitch (A) between the housings of the conveyor means (5) is set by the characteristics of the boxing machine which will have to carry out the inserting operations of the stickpacks, singly or grouped in units, internally of the relative boxes.

The pitch (A) between the housings of the conveyor means (5) is thus different to the pitch (T) existing between the hoppers (1, 2, 3, 4).

The transfer station (S) is configured and predisposed so that the conveyor means (5) is positioned below the series of hoppers (1, 2, 3, 4) and is continuously activatable so that the housings (51, 52, 53, 54) can continuously transit beneath the hoppers (1, 2, 3, 4).

The transfer station (S) further comprises a processor (6) and activating means (7) (schematically denoted by FIGS. 2A and 3A) connected to the unloading hatches (10, 20, 30, 40) of the hoppers (1, 2, 3, 4) and commandable by the processor (6) to open the unloading hatches (10, 20, 30, 40).

The transfer station (S) thus composed and configured is suitable for carrying out the method of the invention for transfer of the stickpacks (ST) from the outlet (U) of a packaging machine to a conveyor means (5) continuously activated for supply to a boxing machine.

The method of the invention comprises steps of:
continuously activating the conveyor means (5) in an advancement direction (V) towards the boxing machine so that the housings (51, 52, 53, 54) continuously transit beneath the hoppers (1, 2, 3, 4);
collecting, in the hoppers (1, 2, 3, 4), corresponding stickpacks (ST) falling from the chute channels (11, 12, 13, 14);
determining the relative position of the housings (51, 52, 53, 54) of the conveyor means (5) with respect to the hoppers (1, 2, 3, 4);
sequentially opening, one after another, the unloading hatches (10, 20, 30, 40) of the hoppers (1, 2, 3, 4) in such a way that the stickpack (ST) present in each hopper (1, 2, 3, 4) falls into a corresponding housing (51, 52, 53, 54) of the housings of the conveyor means (5) transiting beneath the hopper during the continuous advancement thereof in the advancement direction (V).

In this way, it is possible to release, in a sequential way, the various stickpacks present in the series of hoppers directly internally of the housings of the conveyor means concurrently with the passage of each of the housings at a relative hopper of the series of hoppers.

Thus, owing to the location of the conveyor means directly below the series of hoppers, and the modalities of sequential opening of the unloading hatches of the various hoppers concurrently with the passage a relative housing of the conveyor means at a relative hopper of the series of hoppers, with the method of the invention it is possible to realise the transfer of the stickpacks from the outlet (U) of a packaging machine to a conveyor means for supply to a boxing machine in a rapid and effective way, without requiring recourse to the use of external robotic means.

This leads, therefore, to a reduction in the overall volumes, and also to the possibility of a better location of the boxing machine with respect to the packaging machine, with the possibility of arranging them one following the other as the conveyor means is situated below the series of hoppers and has an extension that is tangential to the chute channels of the outlet of the packaging machine.

Preferably, the step of determining the relative position of the housings (51, 52, 53, 54) of the conveyor means (5) with respect to the position of the hoppers (1, 2, 3, 4) can be done using sensor means (not illustrated in detail in the figures as of known type), connected to the processor (6).

The sensor means are predisposed and configured to detect the positions of the housings (51, 52, 53, 54) with respect to the hoppers (1, 2, 3, 4) during the activating of the conveyor means (5) and to send, in real-time, relative signals to the processor (6) in such a way that it can command the activating means (7) to sequentially open the unloading hatches (10, 20, 30, 40) of the series of hoppers (1, 2, 3, 4).

Alternatively, the step of determining the relative position of the housings (51, 52, 53, 54) of the conveyor means (5) with respect to position of the hoppers (1, 2, 3, 4) can be directly carried out by the processor (6) on the basis of the data loaded therein previously and relative to the pitch (T) between the hoppers, to the pitch between the housings, to the initial position of the housings with respect to the hoppers and to the velocity with which the conveyor means (5) will be activated at the start of the operating cycle.

The method of the invention further comprises the following preferred embodiments, according to the effective dimensions of the stickpacks, i.e. according to the effective entity of the pitch (T) existing between the hoppers (1, 2, 3, 4) with respect to the pitch (A) between the housings (51, 52, 53, 54) of the conveyor means (5).

In particular, the method comprises a comparing step for comparing the pitch (T) between the hoppers (1, 2, 3, 4) with the pitch (A) between the housings (51, 52, 53, 54) of the conveyor means (5) in order to determine the relative position of the housings (51, 52, 53, 54) of the conveyor means (5) with respect to the hoppers (1, 2, 3, 4).

More in detail, the comparing step is directed to determining whether the pitch (T) between the hoppers (1, 2, 3, 4) is greater than the pitch (A) between the housings (51, 52, 53, 54) of the conveyor means (5), in such a way as to carry out the step of sequentially opening one after another of the unloading hatches (10, 20, 30, 40) of the hoppers (1, 2, 3, 4) according to the following modalities.

The method of the invention is such that, if the comparing step determines that the pitch (T) between the hoppers (1, 2, 3, 4) is greater than the pitch (A) between the housings (51, 52, 53, 54) (situation illustrated for example in FIG. 2A), then the step of determining the relative position of the housings (51, 52, 53, 54) with respect to the hoppers (1, 2, 3, 4) comprises determining the relative position of a first housing (51) with respect to a first hopper (1) of the series of hoppers (1, 2, 3, 4) which is arranged upstream with respect to the advancement direction (V) of the conveyor means (5).

Therefore, in this situation, the method of the invention is such that, when the first housing (51) transits at the first hopper (1) upstream with respect to the advancement direction (V), the step of sequentially opening, one after another, the unloading hatches (10, 20, 30, 40) comprises first opening the unloading hatch (10) of the first upstream hopper (1) in order to unload a stickpack (ST) contained therein into the first housing (51) (FIG. 2A) and, at each successive advancement of the conveyor means (5) by an entity (W1) equal to the difference between the pitch (T) between the hoppers (1, 2, 3, 4) and the pitch (A) between the housings (51, 52, 53, 54), sequentially opening, one after another, the unloading hatches (20, 30, 40) of the other hoppers (2, 3, 4) arranged consecutively to one another downstream of the first hopper (1) upstream with respect to the advancement direction (V) of the conveyor means (5), in such a way as to unload the stickpacks (ST) contained therein respectively within corresponding housings (52, 53, 54) arranged consecutively to one another downstream of the first housing (51) with respect to the advancement direction (V) of the conveyor means (5) (see the sequence of FIGS. 2B, 2C, 2D and 2E).

Otherwise, if the comparing step determines that the pitch (T) between the hoppers (1, 2, 3, 4) is greater than the pitch (A) between the housings (51, 52, 53, 54) (situation illustrated in FIG. 3A), then the method of the invention is such that the step of determining the relative position of the housings (51, 52, 53, 54) with respect to the hoppers (1, 2, 3, 4) comprises determining the relative position of a first housing (54) with respect to a first hopper (4) of the series of hoppers (1, 2, 3, 4) which is arranged downstream with respect to the advancement direction (V) of the conveyor means (5).

Therefore, in this situation, the method of the invention is such that, when the first housing (54) transits at the first hopper (4) downstream with respect to the advancement direction (V), the step of sequentially opening, one after another, the unloading hatches (10, 20, 30, 40) comprises first opening the unloading hatch (40) of the first downstream hopper (4) in order to unload a stickpack (ST) contained therein into the first housing (54) (FIG. 3A) and, at each successive advancement of the conveyor means (5) by an entity (W2) equal to the difference between the pitch (A) between the housings (51, 52, 53, 54) and the pitch (T) between the hoppers (1, 2, 3, 4), sequentially opening, one after another, the other unloading hatches (30, 20, 10) of the other hoppers (3, 2, 1) arranged consecutively with respect to one another upstream of the first hopper (4) downstream with respect to the advancement direction (V) of the conveyor means (5), in such a way as to unload the stickpacks (ST) contained therein respectively into corresponding housings (53, 52, 51) arranged consecutively of one another upstream of the first housing (54) with respect to the advancement direction (V) of the conveyor means (5) (see the sequence of FIGS. 3B, 3C, 3D and 3E).

The processor program (6) of the transfer station (S) will thus be programmed and configured in such a way as to carry out the comparing step between the pitch (T) of the hoppers (1, 2, 3, 4) and the pitch (A) between the housings (51, 52, 53, 54) of the conveyor means (5), and thus according to whether the pitch (T) is greater or smaller than the pitch (A), to command the activating means (7) to sequentially open the unloading hatches (10, 20, 30, 40) according to one or the other of the above-described modalities.

For example, some possible situations that might arise are the following, in which by way of example a transfer station (S) is taken having a series of hoppers (1, 2, 3, 4) comprising four hoppers (1, 2, 3, 4) (i.e. the situation illustrated in FIGS. 2A-2E and 3A-3E).

The pitch (A) between the housings (51, 52, 53, 54) of the conveyor means (5) for supplying a boxing machine is 63.5 mm.

The widths of the portions of film from which to obtain the stickpacks can vary, usually between the following measurements: 45 mm, 60 mm, 70 mm; consequently the pitch (T) between the hoppers (1, 2, 3, 4) can be 45 mm, 60 mm or 70 mm.

In a case where the width of the portions of film is 70 mm, the transfer station (S) will be configured and predisposed in such a way that the pitch (T) between the four hoppers (1, 2, 3, 4) is correspondingly 70 mm, and therefore the pitch (T) between the hoppers (1, 2, 3, 4) will be greater than the pitch (A) (of 63.5 mm) between the housings (51, 52, 53, 54) of the conveyor means (5).

In this situation, the processor program (6) will command the activating means (7) to sequentially open the unloading hatches (10, 20, 30, 40) of the four hoppers (1, 2, 3, 4) according to the first modality described and therefore according to the sequence illustrated in FIGS. 2A, 2B, 2C, 2D, 2E.

Therefore, the method will comprise determining the relative position of a first housing (51) with respect to a first hopper (1) of the four hoppers (1, 2, 3, 4) which is arranged upstream with respect to the advancement direction (V) of the conveyor means (5), thus with reference to FIG. 2A, the first hopper (1) on the left of the four hoppers (1, 2, 3, 4).

The method will then carry out the following sequential opening of the unloading hatches (10, 20, 30, 40) of the four hoppers (1, 2, 3, 4):

when the first housing (51), during the continuous advancement of the conveyor means (5), is at the first hopper (1) upstream, then the activating means (7) will open the hatch (10) of the first hopper (1) upstream causing the stickpack (ST) contained therein to fall into the first housing (51);

when the conveyor means (5) is advanced by a first entity (W1) equal to the difference between the pitch (T) between the housings and the pitch (T) between the hoppers, then the activating means (7) will open the hatch (20) of the second hopper (20) following the first hopper (1) in the advancement direction (V) of the conveyor means (5), causing the stickpack (ST) contained therein to fall into the second housing (52) immediately preceding (i.e. downstream) the first housing (51) in the advancement direction (V) of the conveyor means (5) (FIG. 2B);

when the conveyor means (5) is advanced by a second entity (W1) equal to the difference between the pitch (T) between the hoppers and the pitch (A) between the housings (FIG. 2C), then the activating means (7) will open the hatch (30) of the third hopper (3) following the second hopper (2) in the advancement direction (V) of the conveyor means (5) causing the stickpack (ST) contained therein to fall into the third housing (53) immediately preceding (i.e. downstream) the second housing (52) in the advancement direction (V) of the conveyor means (5) (FIG. 2C);

when the conveyor means (5) is advanced by a third entity (W1) equal to the difference between the pitch (T) between the housings and the pitch (A) between the hoppers, then the activating means (7) will open the hatch (40) of the fourth hopper (4) following the third hopper (3) in the advancement direction (V) of the conveyor means (5) causing the stickpack (ST) contained therein to fall into the fourth housing (54) immediately preceding (i.e. downstream) the third housing (53) in the advancement direction (V) of the conveyor means (5) (FIG. 2D).

Thus, in this way, the stickpacks (ST) present in the four hoppers (1, 2, 3, 4) are sequentially released and allowed to fall in succession to one another into respective adjacent four housings (51, 52, 53, 54) of the conveyor means (5) (FIG. 2E).

In a case where the measurements of the portions of film are instead 45 mm or 60 mm, the transfer station (S) will be configured and predisposed in such a way that the pitch (T) between the four hoppers (1, 2, 3, 4) is correspondingly 45 mm or 60 mm, and therefore the pitch (T) between the hoppers (1, 2, 3, 4) will be smaller than the pitch (A) (of 63.5 mm) between the housings (51, 52, 53, 54) of the conveyor means (5).

In this situation, the processor program (6) will command the activating means (7) to sequentially open the unloading hatches (10, 20, 30, 40) of the four hoppers (1, 2, 3, 4) according to the second modality described in the foregoing and therefore according to the sequence illustrated in FIGS. 3A, 3B, 3C, 3D, 3E.

Therefore, the method will comprise determining the relative position of a first housing (54) with respect to a first hopper (4) of the four hoppers (1, 2, 3, 4) which is arranged downstream with respect to the advancement direction (V) of the conveyor means (5), thus with reference to FIG. 3A, the first hopper (4) on the right of the four hoppers (1, 2, 3, 4).

The method will then carry out the following sequential opening of the unloading hatches (10, 20, 30, 40) of the four hoppers (1, 2, 3, 4):

when the first housing (54), during the continuous advancement of the conveyor means (5), is at the first hopper (4) downstream, then the activating means (7) will open the hatch (40) of the first hopper (4) downstream causing the stickpack (ST) contained therein to fall into the first housing (54) (FIG. 3A);

when the conveyor means (5) is advanced by a first entity (W2) equal to the difference between the pitch (A) between the housings and the pitch (T) between the hoppers, then the activating means (7) will open the hatch (30) of the second hopper (30) preceding the first hopper (4) downstream in the advancement direction (V) of the conveyor means (5) causing the stickpack (ST) contained therein to fall into the second housing (53) immediately following (i.e. upstream) the first housing (54) in the advancement direction (V) of the conveyor means (5) (FIG. 3B);

when the conveyor means (5) is advanced by a second entity (W2) equal to the difference between the pitch (A) between the housings and the pitch (T) between the hoppers (FIG. 3C), then the activating means (7) will open the hatch (20) of the third hopper (2) preceding the second hopper (3) in the advancement direction (V) of the conveyor means (5) causing the stickpack (ST) contained therein to fall into the third housing (52) immediately following (i.e. upstream) the second housing (53) in the advancement direction (V) of the conveyor means (5) (FIG. 3C);

when the conveyor means (5) is advanced by a third entity (W2) equal to the difference between the pitch (A) between the housings and the pitch (T) between the hoppers, then the activating means (7) will open the hatch (10) of the fourth hopper (1) preceding the third hopper (2) in the advancement direction (V) of the conveyor means (5) causing the stickpack (ST) contained therein to fall into the fourth housing (51) immediately following (i.e. upstream) the third housing (52) in the advancement direction (V) of the conveyor means (5) (FIG. 3D).

Thus, in this way, the stickpacks (ST) present in the four hoppers (1, 2, 3, 4) are sequentially released and allowed to fall in succession to one another into respective adjacent four housings (51, 52, 53, 54) of the conveyor means (5) (FIG. 3E).

From what is described in the foregoing, with the method and the transfer station of the invention, it is possible to carry out the transfer of stickpacks from the outlet of a packaging machine to a conveyor means continuously activated for supply to a boxing machine, and a transfer station of the stickpacks in a way that is effective and immediate, without having recourse to the use of robotic devices for picking up and transferring, with a consequent reduction of volumes.

Further, with transfer station of the invention, it is possible to position the boxing machine in line with the packaging machine, as the conveyor means for supplying the boxing machine is positioned directly below the collection hoppers of the stickpacks, falling from the chute channels of the outlet of the packaging machine, and in particular the conveyor means has an extension that is tangential to the chute channels.

The invention claimed is:

1. A method for transferring stickpacks from an outlet of a packaging machine to a conveyor means continuously activated for supply to a boxing machine, comprising:
   providing a series of hoppers predisposed to receive stickpacks from a series of chute channels provided at the outlet of a packaging machine, wherein the hoppers are distanced from one another by a pitch equal to the distance existing between the chute channels and each comprising an unloading hatch openable for unloading the stickpacks;
   providing a conveyor means for supply of the boxing machine, beneath the hoppers, comprising a series of housings, distanced from one another by a pitch and configured each to receive a relative stickpack to be conveyed to the boxing machine, wherein the pitch between the housings is different from the pitch between the hoppers,
   and comprising steps of:
   continuously activating the conveyor means in an advancement direction towards the boxing machine so that the housings continuously transit beneath the hoppers;
   collecting, in the hoppers, corresponding stickpacks falling from the chute channels;
   determining the relative position of the housings of the conveyor means with respect to the hoppers;
   sequentially opening, one after another, the unloading hatches of the hoppers in such a way that the stickpack present in each hopper falls into a corresponding housing of the housings of the conveyor means transiting beneath the hopper during the continuous advancement thereof in the advancement direction.

2. The method of claim 1, comprising a comparing step for comparing the pitch between the hoppers with the pitch between the housings of the conveyor means in order to determine the relative position of the housings of the conveyor means with respect to the hoppers.

3. A transfer station of stickpacks comprising:
a series of hoppers at a position corresponding to a series of chute channels of an outlet of a packaging machine of stickpacks and distanced from one another by a pitch equal to the distance existing between the chute channels, each hopper being configured to receive a stickpack falling from a relative chute channel and comprising an unloading hatch openable for unloading the stickpack;
a conveyor means for supplying a boxing machine, comprising a series of housings, distanced from one another by a pitch and configured each to receive a relative stickpack to be conveyed to the boxing machine, wherein the conveyor means is positioned below the series of hoppers and is continuously activatable so that the housings can continuously transit beneath the hoppers;
a processor;
activating means connected to the unloading hatches of the hoppers and commandable by the processor to open the unloading hatches;
wherein the processor is programmed and adapted to command the activating means so as to command the sequential opening of the unloading hatches of the hoppers and to carry out the transfer of the stickpacks from the series of hoppers to the housings of the conveyor means continuously activated according to the method of claim 1.

4. A method for transferring stickpacks from an outlet of a packaging machine to a conveyor means continuously activated for supply to a boxing machine, comprising:
providing a series of hoppers predisposed to receive stickpacks from a series of chute channels provided at the outlet of a packaging machine, wherein the hoppers are distanced from one another by a pitch equal to the distance existing between the chute channels and each comprising an unloading hatch openable for unloading the stickpacks;
providing a conveyor means for supply of the boxing machine, beneath the hoppers, comprising a series of housings, distanced from one another by a pitch and configured each to receive a relative stickpack to be conveyed to the boxing machine, wherein the pitch between the housings is different from the pitch between the hoppers,
and comprising steps of:
continuously activating the conveyor means in an advancement direction towards the boxing machine so that the housings continuously transit beneath the hoppers;
collecting, in the hoppers, corresponding stickpacks falling from the chute channels;
determining the relative position of the housings of the conveyor means with respect to the hoppers;
sequentially opening, one after another, the unloading hatches of the hoppers in such a way that the stickpack present in each hopper falls into a corresponding housing of the housings of the conveyor means transiting beneath the hopper during the continuous advancement thereof in the advancement direction
comparing the pitch between the hoppers with the pitch between the housings of the conveyor means in order to determine the relative position of the housings of the conveyor means with respect to the hoppers,
wherein:
if the comparing step determines that the pitch between the hoppers is greater than the pitch between the housings then the step of determining the relative position of the housings with respect to the hoppers comprises determining the relative position of a first housing with respect to a first hopper of the series of hoppers which is arranged upstream with respect to the advancement direction of the conveyor means and, when the first housing transits at the first hopper upstream with respect to the advancement direction, the step of sequentially opening, one after another, the unloading hatches comprises first opening the unloading hatch of the first upstream hopper in order to unload a stickpack contained therein into the first housing and, at each successive advancement of the conveyor means by an entity equal to the difference between the pitch between the hoppers and the pitch between the housings, sequentially opening, one after another, the unloading hatches of the other hoppers arranged consecutively to one another downstream of the first hopper upstream with respect to the advancement direction of the conveyor means, in such a way as to unload the stickpacks contained therein respectively within corresponding housings arranged consecutively to one another downstream of the first housing with respect to the advancement direction of the conveyor means;
otherwise, if the comparing step determines that the pitch between the hoppers is smaller than the pitch between the housings then the step of determining the relative position of the housings with respect to the hoppers comprises determining the relative position of a first housing with respect to a first hopper of the series of hoppers which is arranged downstream with respect to the advancement direction of the conveyor means and, when the first housing transits at the first hopper downstream with respect to the advancement direction, the step of sequentially opening, one after another, the unloading hatches comprises first opening the unloading hatch of the first downstream hopper in order to unload a stickpack contained therein into the first housing and, at each successive advancement of the conveyor means by an entity equal to the difference between the pitch between the housings and the pitch between the hoppers, sequentially opening, one after another, the other unloading hatches of the other hoppers arranged consecutively with respect to one another upstream of the first hopper downstream with respect to the advancement direction of the conveyor means, in such a way as to unload the stickpacks contained therein respectively into corresponding housings arranged consecutively of one another upstream of the first housing with respect to the advancement direction of the conveyor means.

* * * * *